Patented Aug. 12, 1930

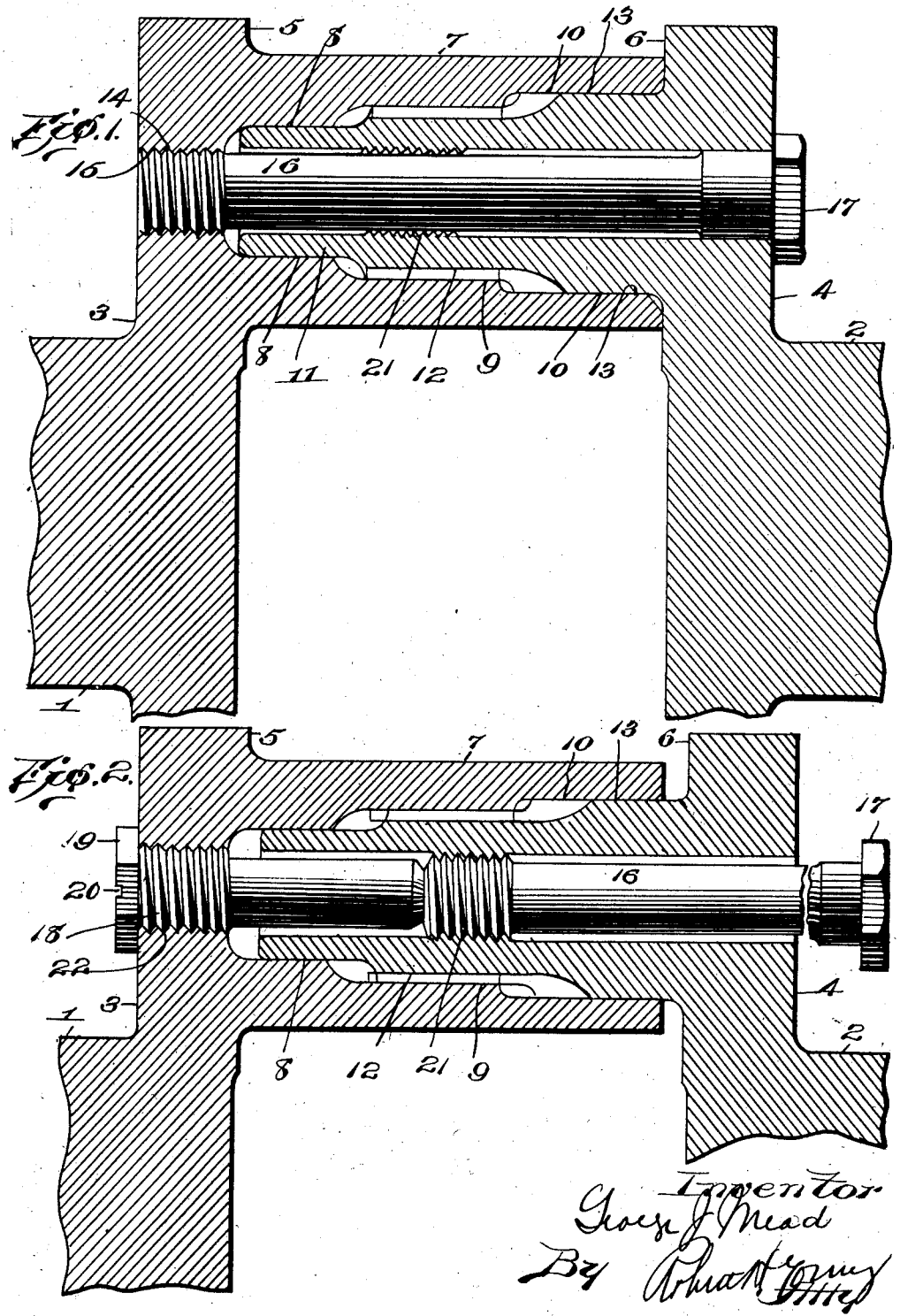
Aug. 12, 1930.     G. J. MEAD     1,772,631
CRANK SHAFT CONSTRUCTION
Filed Oct. 13, 1926

1,772,631

UNITED STATES PATENT OFFICE

GEORGE J. MEAD, OF HARTFORD, CONNECTICUT, ASSIGNOR TO THE PRATT & WHITNEY AIRCRAFT CO., OF HARTFORD, CONNECTICUT

CRANK-SHAFT CONSTRUCTION

Application filed October 13, 1926. Serial No. 141,356.

This invention relates in general to internal combustion engines and more particularly to a novel type of crank shaft construction therefor.

In the design and construction of internal combustion engines it is desirable in many cases to provide one-piece connecting rods, especially when ball or roller bearings are to be used in the large end of the connecting rod. In radial engines, where the master rod is used having a number of knuckle pins for the attachment of link rods, the conventional form of connecting rod, embodying a bolted-on cap, is impractical since, in such structure, it is necessary to space the bolts widely. Such structure makes it difficult if not impossible to provide the necessary degree of rigidity and strength in the big end of the connecting rod. A one-piece connecting rod has many advantages over the one which is provided with a separate connecting-rod cap but can be used only when the crank shaft is divided.

I am aware that it is not new in the art to provide a two-part crank shaft but all crank shafts of this nature of which I have been aware heretofore have been unsatisfactory, owing to inherent defects in their design and construction. For instance, difficulty has been experienced in maintaining alignment of the two parts of the shaft, and in consequence, the bearing surface at the large end of the connecting-rod has worn out quickly. Two-part crank shafts, as heretofore made, have lacked the essential quality of rigidity. No provision has been made for forcible separation of the two parts upon disassembly, and no provision has been made to prevent deflection in the two parts under load stress.

It is an object of my invention to provide a two-part crank shaft embodying two principal component parts, which, for the purposes of identification, are designated hereinafter as the main shaft and the tail shaft. The main shaft is provided with a female crank-pin portion consisting primarily of a member having exteriorly thereof a longitudinally extending connecting rod journal and interiorly thereof a recess to receive the male portion of the crank pin, the two component members of the crank pin having means for maintaining their alignment and for preventing relative rotation.

It is another object of my invention to provide means for securing together the component parts of my crank shaft in such a manner as to insure an equal distribution of load over the contacting surfaces thereof.

It is a further object of my invention to provide means for forcing apart the two component parts of the crank shaft in disassembly.

Other objects of my invention will appear in the accompanying specification and claims and will be disclosed in the accompanying drawings in which:

Figure 1 is a central vertical section through a crank shaft embodying my structure;

Figure 2 is a view similar to that shown in Figure 1, and disclosing my method of separating or forcing apart the component parts of my crank shaft during disassembly.

Referring now with greater particularity to the drawings it will be seen that my device is comprised as follows:

The main crank shaft 1 is provided with a female crank-pin portion 3 having a central bore to receive the hollow male crank-pin portion 4 of the tail shaft 2. Exteriorly the crank-pin portion 3 is suitably formed at 7 to provide a bearing for the connecting rod of the engine. The crank-pin portions 3 and 4 are provided with shoulders 5 and 6 respectively, to prevent side play of the connecting rod. The bore of the member 3 is divided substantially into three parts: cylindrical portions 8 and 10, approximately one-third of its total length, adjacent each end, and a splined portion 9 intermediate of said cylindrical portions. The tail-shaft crank-pin member 4 is twice reduced in diameter from right to left as viewed in Figure 1, the portions 11 and 13 thereof being adapted to fit snugly within the cylindrical bores 8 and 10, respectively, and the central portion thereof being splined at 12 to fit snugly with the splines 9.

The portion 3 of the main-shaft crank-pin member has a screw-threaded aperture 14 into which the screw-threaded end 15 of a clamping bolt 16 is screwed by the rotation of its head 17.

Having reference now especially to Figure 2 it will be seen that I have provided the interior of the bore of the male crank-pin member 4, intermediate of its ends, with a threaded portion 21, the threads of which are of the same pitch and the bore of which corresponds to the diameter of the threaded end 15 of bolt 16. When it is desired to separate the two parts of the crank shaft in disassembly, the head 17 is rotated in a counter-clockwise direction, and bolt 16 is withdrawn until it is free of the threads 15 and in full engagement with the threads 21. A stud 18 is then screwed into the recess 15 until the end thereof abuts the end of the bolt 16. Further rotation of stud 18 will result in forcing the main shaft and the tail shaft apart. A suitable head 19 is provided for turning the bolt when the stress necessary to be exerted is great, while a slot 20 adapted for the reception of a screw-driver is provided for use under ordinary circumstances.

From the foregoing it will be seen that the outer surface 7 of the crank-pin portion acts as a bearing for the connecting rod, which bearing is limited laterally by the webs 5 and 6 of the crank shaft sections. The bore of the member 7 is formed to co-act with the exterior of the member 4 to provide the two pilot portions 11 and 13, to insure alignment of the parts of the crank shaft while the splines 9 and 12 coact to prevent relative rotation. The bolt 16 serves to compress the parts 3 and 4 equally, thus avoiding the misalignment which occurs in shafts heretofore used, in which the left-hand end of the male portion of the crank-pin is threaded and drawn in by a nut. The internal threaded portion 21 cooperates with the bolt 18 and the threaded aperture 14, to provide means for separating parts 3 and 4.

While I have shown a single-throw crank shaft, it must not be understood that my invention is limited to such structure as it is capable of adaptation to various types of shafts. It is also within the scope of my invention to provide similarly for the joining of more than two crank shaft sections.

I claim:

1. In combination, in a two-part crank shaft, a main-shaft member having a crank-pin offset, a tail-shaft member having a crank pin offset, one of said offsets being bored to provide a female recess and the other being formed to provide a male member to fit within said recess, said female recess being provided with non-adjacent cylindrical portions, said male member being formed with cylindrical portions to fit within said female cylindrical portions to maintain said offsets in alignment, and means co-axial with said shafts for holding said members rigidly together.

2. In combination, in a two-part crank shaft, a main-shaft member having a crank pin offset, a tail-shaft member having a crank pin offset, one of said offsets being bored to provide a female recess and the other being formed to provide a male member to fit within said recess, said female recess being provided with non-adjacent cylindrical portions, said male member being formed with cylindrical portions to fit within said female cylindrical portions to maintain said offsets in alignment, and a bolt co-axial with said shafts bearing against one of said offsets and extending throughout the length thereof and screw-threadedly engaging with the other to hold the same rigidly together.

3. In combination in a two-part crank shaft, a main-shaft member having a crank pin offset adapted to provide a complete bearing for a connecting rod, a tail-shaft member having a crank pin offset, one of said offsets being bored to provide a female recess and the other being formed to provide a male member to fit within said recess, said female recess being provided with non-adjacent cylindrical portions, said male member being formed with cylindrical portions to fit within said female cylindrical portions to maintain said crank-pin offsets in alignment, and means co-axial with and extending throughout the length thereof for holding said crank-pin offsets rigidly together.

4. In combination, in a two-part crank shaft, a main-shaft member having a crank pin offset, a tail-shaft member having a crank pin offset, one of said offsets being bored to provide a female recess and the other being formed to provide a male member to fit within said recess, said female recess being provided with non-adjacent cylindrical portions, said male member being formed with cylindrical portions to fit within said female cylindrical portions to maintain said offsets in alignment, splined portions intermediate of said cylindrical portions in said offsets adapted to engage with each other to prevent relative rotation, and means for holding said offsets rigidly together.

5. In combination, in a two-part crank shaft, a main-shaft member having a crank pin offset, a tail-shaft member having a crank pin offset, one of said offsets being bored to provide a female recess and the other being formed to provide a male member to fit within said recess, said female recess being provided with non-adjacent, or spaced cylindrical portions, said male member being formed with cylindrical portions to fit within said female cylindrical portions to maintain said offsets in alignment, splined portions intermediate of said cylindrical portions in said offsets adapted to engage with each other to prevent relative rotation, and a bolt bearing against one of said offsets and screw-threadedly engaging with the other to hold the same rigidly together.

6. In combination, in a two-part crank shaft, a main-shaft member having a crank pin offset adapted to provide a complete bearing for a connecting rod, a tail-shaft member having a crank pin offset, one of said offsets being bored to provide a female recess and the other being formed to provide a male member to fit within said recess, said female recess being provided with spaced cylindrical portions, said male member being formed with cylindrical portions to fit within said female cylindrical portions to maintain said offsets in alignment, splined portions intermediate of said cylindrical portions in said offsets adapted to engage with each other to prevent relative rotation, and means for holding said offsets rigidly together.

7. In combination, in a two-part crank shaft, a main-shaft member having a crank pin offset adapted to provide a complete bearing for a connecting rod, a tail shaft member having a crank pin offset, one of said offsets being bored to provide a female recess and the other being formed to provide a male member to fit within said recess, said female recess being provided with spaced cylindrical portions, said male member being formed with cylindrical portions to fit within said female cylindrical portions to maintain said offsets in alignment, splined portions intermediate of said cylindrical portions in said offsets adapted to engage with each other to prevent relative rotation, and means for holding said offsets rigidly together.

8. In combination, in a two-part crank shaft, a main-shaft member, a tail-shaft member, a connecting rod journal formed on said main shaft member, means for securing said members together, and means in said tail shaft member adapted to engage with said last named means intermediate of the ends of the tail shaft member to aid in forcibly separating said shaft members upon disassembly.

9. In combination, in a two-part crank shaft, a main-shaft member having a crank pin offset, a tail-shaft member having a crank pin offset, one of said offsets being bored to provide a female recess and the other being formed to provide a male member to fit within said recess, said female recess being provided with non-adjacent cylindrical portions, said male member being formed with cylindrical portions to fit within said female cylindrical portions to maintain said offsets in alignment, splined portions intermediate of said cylindrical portions in said offsets adapted to engage with each other to prevent relative rotation, means for holding said offsets rigidly together, and means in said tail shaft member adapted to engage with said last named means intermediate of the ends of the tail shaft member to aid in forcibly separating said shaft members upon disassembly.

10. In a crank shaft having pieces joined and separable at a crank pin, the combination, at that crank pin, of a cylindrical outer surface on one of the pieces, forming the journal for a connecting rod, a recess in said piece, co-axial with said cylindrical outer surface, the middle portion of the length of said recess being splined, and the adjacent portions toward both ends being cylindrical, another piece of the crank shaft having a male end fitting closely into both the splines and the cylindrical portions of the recess, a bolt co-axial with said crank pin, threaded into one of the two pieces of the crank shaft there joined, and adapted to draw them tightly together, said bolt being adapted to screw-threadedly engage the other of the two said pieces intermediate of its ends to act as an abutment for a tool for forcing the two said pieces apart upon disassembly.

11. In combination in a two part crank shaft, a main shaft member, a tail shaft member, a connecting rod journal formed on said main shaft member, and means for securing said members together, said last-named means being adapted to screw-threadedly engage said tail shaft member intermediate of its ends to act as an abutment for a tool for forcing the two said members apart upon disassembly.

In testimony whereof I affix my signature.
GEORGE J. MEAD.